(12) United States Patent
Ma

(10) Patent No.: US 8,718,212 B2
(45) Date of Patent: May 6, 2014

(54) RATE MATCHING METHOD AND APPARATUS

(71) Applicant: Huawei Technologies Co., Ltd., Guangdong (CN)

(72) Inventor: Xin Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/731,664

(22) Filed: Dec. 31, 2012

(65) Prior Publication Data

US 2013/0182805 A1 Jul. 18, 2013

Related U.S. Application Data

(63) Continuation of application No. PCT/CN2011/073346, filed on Apr. 27, 2011.

(30) Foreign Application Priority Data

Jul. 20, 2010 (CN) .......................... 2010 1 0234885

(51) Int. Cl.
*H04L 7/00* (2006.01)
(52) U.S. Cl.
USPC ........... 375/354; 375/224; 375/295; 375/316; 375/320; 375/261; 375/260; 375/264; 375/298; 714/800; 714/746; 714/786; 714/755; 714/758; 341/81; 341/51; 370/328; 370/315; 370/535; 370/545
(58) Field of Classification Search
USPC ......... 375/354, 224, 298, 295, 316, 320, 261, 375/260, 264, 26; 714/800, E11.032, 746, 714/786, 755, 758; 341/81, 51; 370/328, 370/315, 535, 545
See application file for complete search history.

(56) References Cited

U.S. PATENT DOCUMENTS 4,908,874 A * 3/1990 Gabriel .......................... 382/277
2003/0120995 A1* 6/2003 Kim et al. ...................... 714/786

(Continued)

FOREIGN PATENT DOCUMENTS

CN 101510781 A 8/2008
CN 101641896 A 2/2010

(Continued)

OTHER PUBLICATIONS

3GPP TS 36.212 v8.6.0—"3rd Generation Partnership Project; Technical Specification Group Radio Access Network; Evolved Universal Terrestrial Radio Access (E-UTRA); Multiplexing and Channel Coding", (Release 8), Mar. 2009, 59 pages.
International Search Report dated Aug. 4, 2011 in connection with International Patent Application No. PCT/CN2011/073346.

*Primary Examiner* — Sam K Ahn
*Assistant Examiner* — Fabricio R Murillo Garcia

(57) ABSTRACT

Embodiments of the present invention provide a rate matching method and apparatus. The method includes: receiving bit data of a first, a second, and a third input subblock, inserting dummy data into bit data in each subblock to respectively form even-numbered rows and odd-numbered rows of a matrix to be buffered for each subblock; inputting bit data of the even-numbered rows in the even-numbered row buffer and bit data of the odd-numbered rows in the odd-numbered row buffer of each subblock to a second buffer, and forming a matrix by using the bit data of the even-numbered rows and the bit data of the odd-numbered rows; controlling the second buffer to send data at the specified address; selecting data sent by the second buffer; and deleting the dummy data from the selected data to obtain valid output data.

12 Claims, 5 Drawing Sheets

(56) References Cited

U.S. PATENT DOCUMENTS

2008/0320353 A1* 12/2008 Blankenship et al. ........ 714/746
2009/0024909 A1* 1/2009 Shen et al. .................... 714/800
2009/0086849 A1* 4/2009 Tsai et al. ..................... 375/298
2009/0147724 A1* 6/2009 Nimbalker et al. ........... 370/315
2011/0134982 A1* 6/2011 Reinhardt ..................... 375/224

FOREIGN PATENT DOCUMENTS

CN 101895374 A 11/2010
WO WO 2010/012544 A2 2/2010

* cited by examiner

| Column number | 0 | 1 | 2 | 3 | 4 | 5 | ... | 19 | 20 | 21 | ... | 31 |
|---|---|---|---|---|---|---|---|---|---|---|---|---|
| Content | Dummy data | Dummy data | Dummy data | Dummy data | a_0 | a_1 | ... | a_15 | b_0 | b_1 | ... | b_11 |

Even-numbered row buffer

| Column number | 0 | 1 | 2 | 3 | 4 | 5 | ... | ... | ... | ... | ... | 31 |
|---|---|---|---|---|---|---|---|---|---|---|---|---|
| Content | b_12 | b_13 | b_14 | b_15 | c_0 | c_1 | ... | ... | ... | ... | ... | ... |

Odd-numbered row buffer

FIG. 4

RATE MATCHING METHOD AND APPARATUS

CROSS-REFERENCE TO RELATED APPLICATIONS

This application is a continuation of International Application No. PCT/CN2011/073346, filed on Apr. 27, 2011, which claims priority to Chinese Patent Application No. 201010234885.3, filed on Jul. 20, 2010, both of which are hereby incorporated by reference in their entireties.

TECHNICAL FIELD

Embodiments of the present invention relate to the field of communications technologies, and in particular to a rate matching method and apparatus.

BACKGROUND

In a 3GPP long term evolution (Long Term Evolution, LTE for short) system, the channel encoding procedure requires rate matching to obtain encoded data at the required bit rate.

Generally, a rate matching method includes three steps: subblock interleaving, bit collection, and bit pruning. At the step of subblock interleaving, the sequence for bits in three input bit streams is adjusted. These three bit streams include one system bit stream and two check bit streams. At the step of bit collection, bit data in the three interleaved bit streams is deposited in the buffer, data about the system bit stream is collected, and then data about the two check bit streams is collected by turns. At the step of bit pruning, data about a specified number of bits is read from the buffer to complete rate matching.

In the prior art, the three steps of rate matching are only summarized, but the detailed implementation procedure of each step is not provided.

SUMMARY

Embodiments of the present invention provide a rate matching method and apparatus, providing specific implementation of rate matching.

An embodiment of the present invention provides a rate matching method, including:

receiving bit data of a first, a second, and a third input subblock, inserting dummy data into bit data in each subblock to respectively form even-numbered rows and odd-numbered rows of a matrix to be buffered for each subblock, and respectively storing bit data of the even-numbered rows and odd-numbered rows to an even-numbered row buffer and an odd-numbered row buffer of each subblock;

inputting bit data of the even-numbered rows in the even-numbered row buffer and bit data of the odd-numbered rows in the odd-numbered row buffer of each subblock to a second buffer mapping to each subblock, and respectively forming a matrix of $R_{subblock}^{TC}$ rows and $V_{subblock}^{TC}$ columns by using the bit data of the even-numbered rows and the bit data of the odd-numbered rows of each subblock;

acquiring a specified address of data of each subblock, and sending the specified address to the second buffer mapping to each subblock, so that the second buffer mapping to each subblock sends data at the specified address;

receiving data sent by the second buffer and selecting data of specified subblocks from the received data;

deleting dummy data from the selected data according to the specified address to obtain valid output data; and sending the valid output data after joining, where a length of sent valid output data is equal to a preset output length.

An embodiment of the present invention further provides a rate matching apparatus, including:

a first buffer respectively mapping to bit data of a first subblock, a second subblock, and a third subblock, including an odd-numbered row buffer and an even-numbered row buffer, respectively configured to receive bit data of a first, a second, and a third input subblock, insert dummy data into bit data in the first subblock, the second subblock, and the third subblock to respectively form even-numbered rows and odd-numbered rows of a matrix to be buffered for the first subblock, the second subblock, and the third subblock, and respectively store bit data of the even-numbered rows and odd-numbered rows to the even-numbered row buffer and odd-numbered row buffer of the first subblock, the second subblock, and the third subblock;

a second buffer respectively mapping to data of the first subblock, the second subblock, and the third subblock, respectively configured to buffer bit data of the even-numbered rows in the even-numbered row buffer and bit data of the odd-numbered rows in the odd-numbered row buffer of the first subblock, the second subblock, and the third subblock, and respectively form a matrix of $R_{subblock}^{TC}$ rows and $V_{subblock}^{TC}$ columns by using the bit data of the even-numbered rows and the bit data of the odd-numbered rows;

an address acquiring module, configured to acquire a specified address of data of each subblock, and send the specified address of the data of each subblock to the second buffer respectively mapping to the first subblock, the second subblock, and the third subblock, so that the second buffer sends data at the specified address;

a selecting module, configured to receive data sent by the second buffer and select data of specified subblocks from the received data;

a deleting module, configured to delete dummy data from the selected data according to the specified address acquired by the address acquiring module to obtain valid output data; and a joining module, configured to send the valid output data after joining, where a length of sent valid output data is equal to a preset output length.

According to the rate matching method and apparatus in the embodiments of the present invention, after dummy data is inserted into bit data of three subblocks to respectively form even-numbered rows and odd-numbered rows of a matrix to be buffered for each subblock. Bit data of the even-numbered rows and bit data of the odd-numbered rows are respectively buffered to the even-numbered row buffer and odd-numbered row buffer of each subblock. Then data of each subblock is input to the second buffer, and a matrix is formed respectively by using the bit data of the even-numbered rows and the bit data of the odd-numbered rows of each subblock, implementing storage of bit data of each subblock. Then the specified address of the data of each subblock is acquired. The sequence of these addresses is different from the input sequence of the bit data of each subblock, thereby implementing interleaving of bit data. Subsequently, data of a specified subblock is selected and dummy data is deleted to obtain valid output data, and valid data is joined, implementing bit collection and bit pruning for data of each subblock. As such, embodiments of the present invention provide a specific rate matching method.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

FIG. 4 shows an implementation circuit of level-1 buffer by taking an even-numbered row buffer of a matrix as an example.

DETAILED DESCRIPTION

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
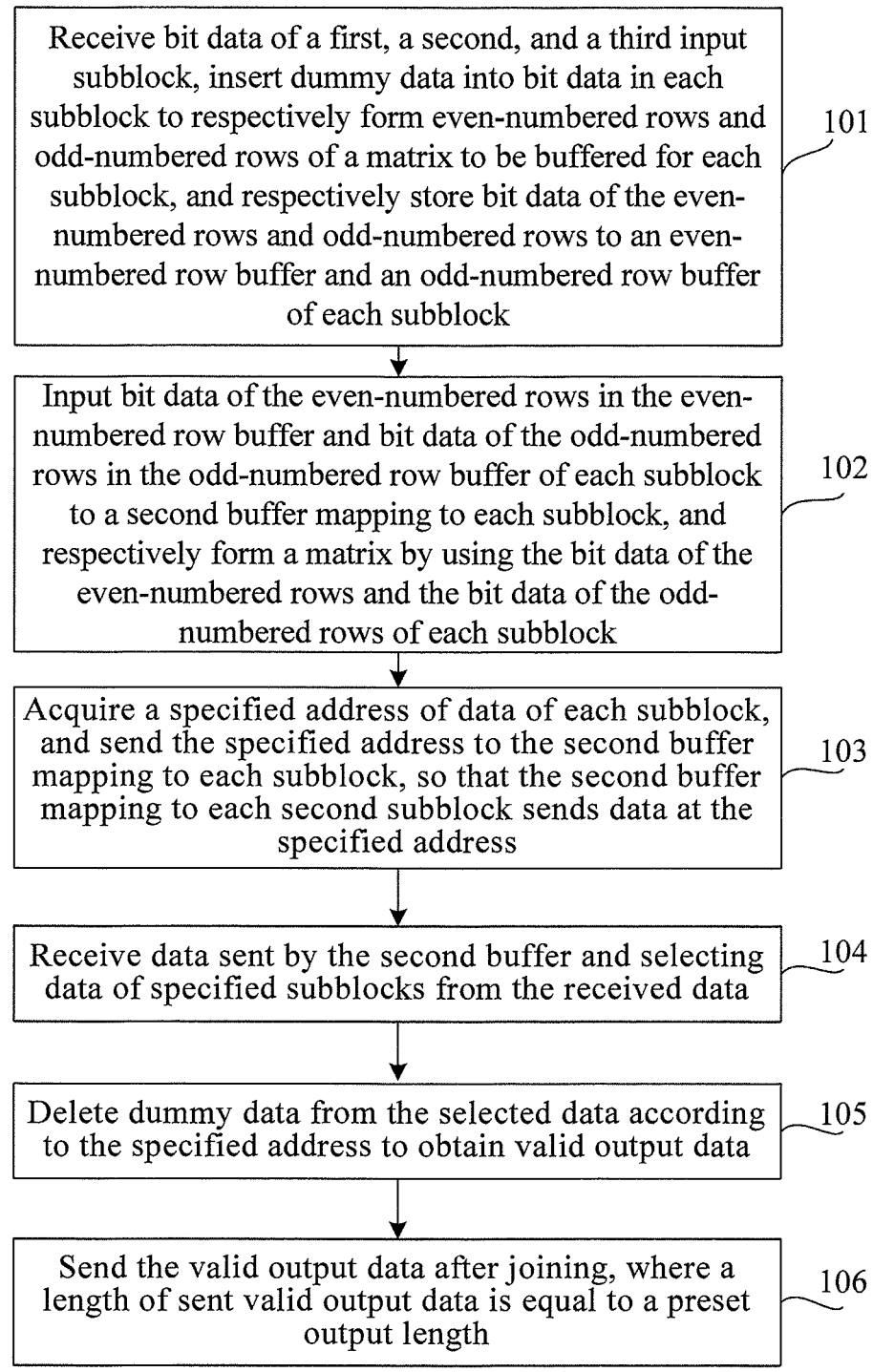
FIG. 1 is a flow chart of a rate matching method according to a first embodiment of the present invention.

FIG. 1 is a flow chart of a rate matching method according to a first embodiment of the present invention, including:

Step 101: Receive bit data of a first, a second, and a third input subblock, insert dummy data into bit data in each subblock to respectively form even-numbered rows and odd-numbered rows of a matrix to be buffered for each subblock, and respectively store bit data of the even-numbered rows and odd-numbered rows to an even-numbered row buffer and an odd-numbered row buffer of each subblock.

Step 102: Input bit data of the even-numbered rows in the even-numbered row buffer and bit data of the odd-numbered rows in the odd-numbered row buffer of each subblock to a second buffer mapping to each subblock, and respectively form a matrix of subblock $R_{subblock}^{TC}$ rows and $V_{subblock}^{TC}$ columns by using the bit data of the even-numbered rows and the bit data of the odd-numbered rows of each subblock.

Step 103: Acquire a specified address of data of each subblock, and send the specified address to the second buffer mapping to each subblock, so that the second buffer mapping to each second subblock sends data at the specified address.

Step 104: Receive data sent by the second buffer and select data of specified subblocks from the received data.

Step 105: Delete dummy data from the selected data according to the specified address to obtain valid output data.

Step 106: Send the valid output data after joining, where a length of sent valid output data is equal to a preset output length.

Figure 2:
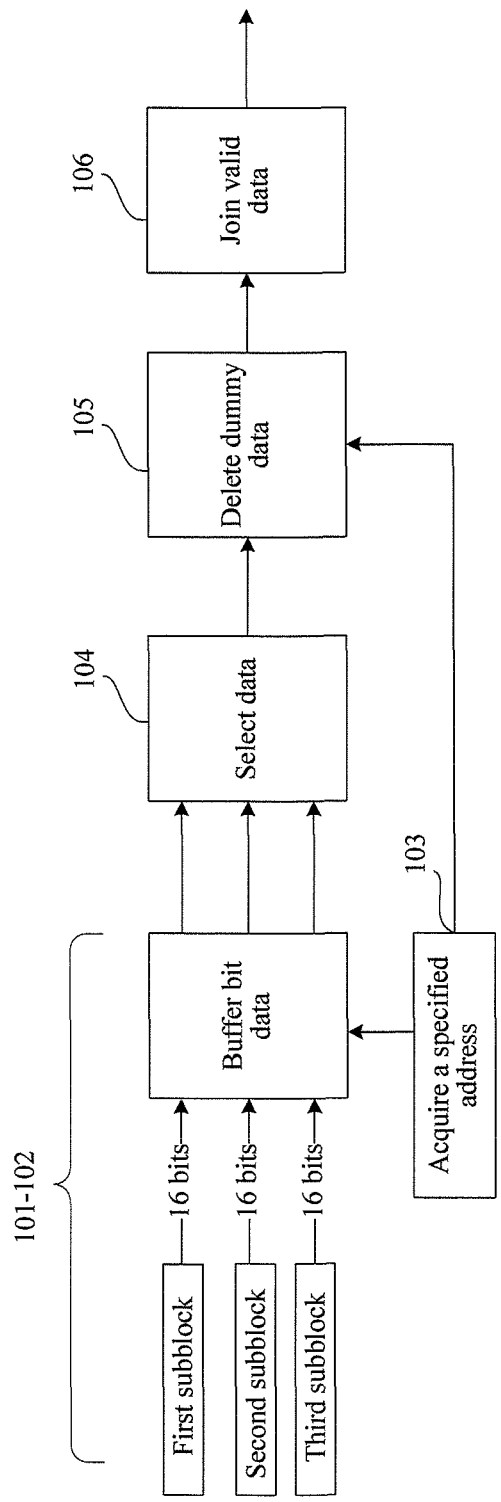
FIG. 2 is a principal schematic diagram of a rate matching method according to the present invention.

FIG. 2 is a principal schematic diagram of a rate matching method according to the present invention. The following specifically describes the implementation of rate matching method according to the present invention by combining FIG. 1 and FIG. 2.

Bit data of the first subblock, the second subblock, and the third subblock is respectively system bit data, first check bit data, and second check bit data. The parallel efficiency of the bit data in the three subblocks is 16 bits. The bit data in the three subblocks is input to the rate matching apparatus in a parallel mode.

According to specification of section 5.1.4.1 in the 3GPP TS 36.212 V8.6.0 protocol, incorporated herein by reference, the input bit data is buffered in the form of a matrix. The form of the matrix may be preset. In this embodiment, assume that the preset matrix form is 4 rows 32 columns, and the input data length of the bit data of each subblock is 124 bits.

Figure 3:
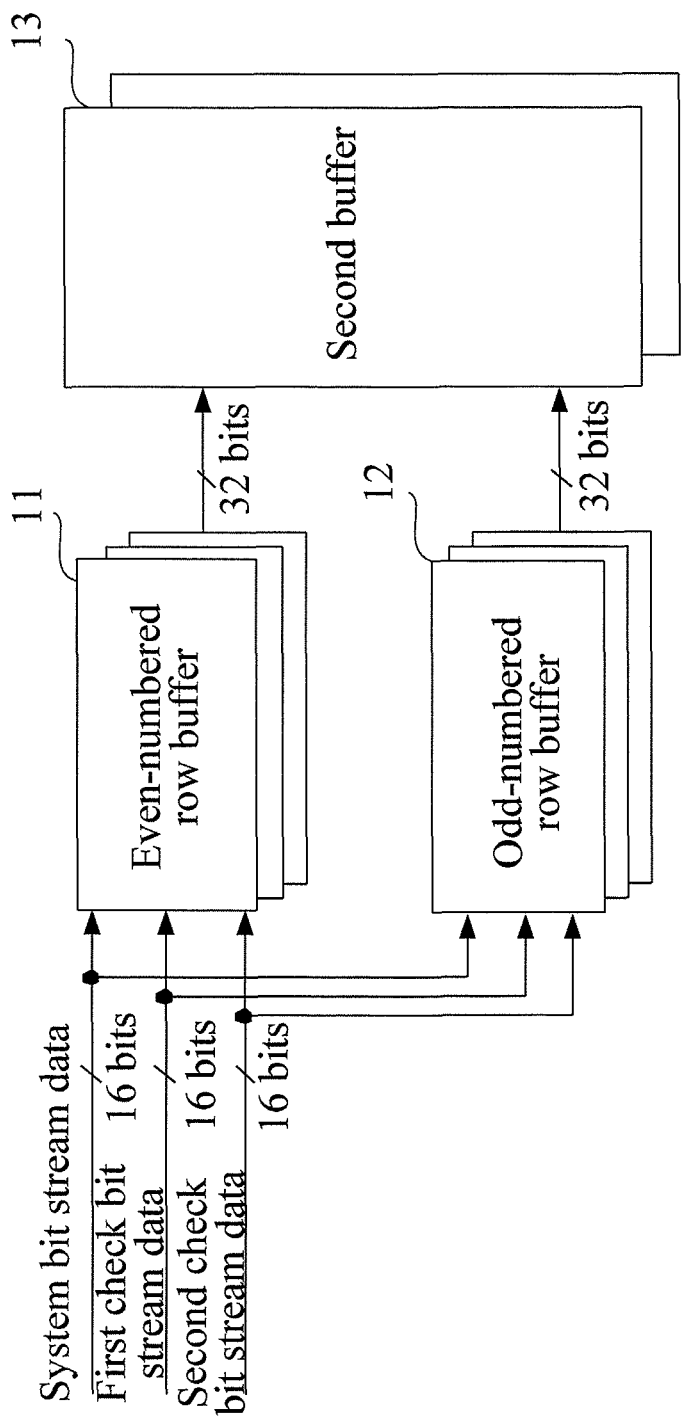
FIG. 3 is a schematic diagram of bit data buffered and input according to the present invention.

FIG. 3 is a schematic diagram of bit data buffered and input according to the present invention. System bit data in the first subblock is taken as an example. In step 101, system bit data is received first, and dummy data is inserted into the system bit data to form even-numbered rows of the matrix to be buffered. In the preset 4-row 32-column matrix, rows 0 and 2 are even-numbered rows, and rows 1 and 3 are odd-numbered rows. When the input length of each bit data item is 124 bits, for 16-bit data input in a first clock period, 4 dummy data items need to be inserted to form 32 columns of data in row 0 of the matrix with 12-bit data input in a second clock period, and data in row 0 is stored in the even-numbered row buffer 11. The rest 4-bit data input in the second clock period and bit data input in subsequent clock periods form 32-column data in row 1, and the data in row 1 is stored in the odd-numbered row buffer 12. The rest is deduced through analogy. The method for storing bit data in row 2 and row 3 is similar.

Bit data in the second subblock and third subblock is stored to the respective odd-numbered row buffer and even-numbered row buffer by using a similar method.

In step 102, bit data of the even-numbered rows in the even-numbered row buffer 11 and bit data of the odd-numbered rows in the odd-numbered row buffer 12 in each subblock are input to the second buffer 13. The odd-numbered row buffer 12 and even-numbered row buffer 11 in step 101 may be viewed as first level buffers, and the second buffer 13 in step 102 may be viewed as a second level buffer. In the second level buffer, bit data of the even-numbered rows and odd-numbered rows forms a 4-row 32-column matrix. In step 101, bit data of one subblock is buffered in the forms of even-numbered rows and odd-numbered rows. In this way, the parallel efficiency of the data input to the second level buffer changes to 32 bits.

In the prior art, dummy data is inserted into input bit data to form a preset matrix. According to specification of section 5.1.4.1 in the 3GPP TS 36.212 V8.6.0 protocol, one matrix composition method is used for system bit data, another matrix composition method is used for two system check bit data items, and then formed matrices are buffered in a uniform manner. Such a method for buffering the matrices occupies many logical resources and will result in a long delay. The storage method in steps 101 and 102 according to this embodiment is a two-level storage method, where odd-numbered rows and even-numbered rows in a matrix are stored respectively in a first level buffer, and then form the matrix in a second level buffer. A same buffering method is used for bit data of three subblocks. The occupied logical resources are few, and a delay may be reduced.

To further improve throughput, in step 102, bit data of the even-numbered rows in the even-numbered row buffer and bit data of the odd-numbered rows in the odd-numbered row buffer may be stored to two sub buffers in the second buffer in a ping-pong buffering manner. Ping-pong buffering is a buffering method. Specifically, in a first time period, bit data in the odd-numbered row buffer and even-numbered row buffer may be buffered to a first sub buffer, and in a second time period, bit data in the odd-numbered row buffer and even-numbered row buffer may be buffered to a second sub buffer. The rest is deduced through analogy. The first sub buffer and second sub buffer are used by turns to buffer bit data in the first level buffer.

FIG. 4 shows an implementation circuit of level-1 buffer by taking an even-numbered row buffer of a matrix as an example. The level-1 buffer is implemented by using registers. According to the difference of a write address signal input each time, input data is sorted and joined to obtain 32-bit data each time, and then the data is output to the second level buffer.

In this embodiment, assume that the form of the preset matrix is 4 rows and 32 columns, and the input length of bit data of each subblock is 124 bits. Four dummy data items need to be filled during input of bit data. Therefore, the write address in the first clock period is 4. Bit data a_1 to a_15 whose input address is input_data0 [15:0] is written to bit even_buff [4:19] in the even-numbered row buffer, no data is written into the odd-numbered row buffer, and the write address is added by 16 at the same time. The write address in the second clock period is 20. Then bit data b_1 to b_11 whose input address is input_data0 [11:0] is written to bit even_buff [20:31] in the even-numbered row buffer, bit data b_12 to b_15 whose input address is input_data0 [15:12] is written to bit odd_buff [3:0] in the odd-numbered row buffer, and the write address is added by 16 at the same time. The write address in the third clock period is 36. Bit data c_0 to c_15 whose input address is input_data0 [15:0] is written to bit odd_buff [4:19] in the odd-numbered row buffer, and no data is written into the even-numbered row buffer. Data is written repeatedly by turns to the even-numbered row buffer and odd-numbered row buffer. The valid 32-bit data obtained each time is output to the second buffer.

In step 103, a specified address of data of each subblock is acquired, and the specified address is sent to the second buffer mapping to each subblock, so that the second buffer mapping to each subblock sends data at the specified address. In step 103, data is output according to the specified address, and the sequence for the input bit data may be changed to meet the purpose of interleaving.

The specified address varies according to bit data of different subblocks. Specifically, the expression for the specified address of the data of the first subblock is shown in formula (1):

$$addr_1(index_1) = (index_1 \bmod R^{TC}_{subblock}) \times 2^5 + \text{reverse}\left(\left\lfloor \frac{index_1}{R^{TC}_{subblock}} \right\rfloor [4:0]\right) \quad (1)$$

In formula (1), all data is expressed in a binary form, $addr_1(index_1)$ indicates the acquired specified address of the data of the first subblock, and $index_1$ is an integer ranging from 0 to $(R_{subblock}^{TC} \times V_{subblock}^{TC} - 1)$. For example, for a 4-row 32-column matrix, the value of $index_1$ is an integer ranging from 0 to 127. mod indicates modular operation, $$\left\lfloor \frac{index_1}{R^{TC}_{subblock}} \right\rfloor$$

means to round down $$\frac{index_1}{R^{TC}_{subblock}}, \left\lfloor \frac{index_1}{R^{TC}_{subblock}} \right\rfloor [4:0]$$

indicates that the binary data bit width obtained after calculation is 5 bits (bit), and $$\text{reverse}\left(\left\lfloor \frac{index_1}{R^{TC}_{subblock}} \right\rfloor [4:0]\right)$$

means to sort $$\left\lfloor \frac{index_1}{R^{TC}_{subblock}} \right\rfloor [4:0]$$

in a reverse sequence.

The expression for the specified address of the data of the second subblock is shown in formula (2):

$$addr_2(index_2) = \left(\left\lfloor \frac{(index_2 - K_\Pi)}{2} \right\rfloor \bmod R^{TC}_{subblock}\right) \times 2^5 + \text{reverse}\left(\left\lfloor \frac{\left\lfloor \frac{(index_2 - K_\Pi)}{2} \right\rfloor}{R^{TC}_{subblock}} \right\rfloor [4:0]\right) \quad (2)$$

In formula (2), all data is expressed in a binary form, $addr_2(index_2)$ indicates the acquired specified address of the data of the second subblock, and $index_2$ is an integer ranging from 0 to $(R_{subblock}^{TC} \times V_{subblock}^{TC} - 1)$ $K_\Pi$ is a product of rows and columns of the matrix, $$\left\lfloor \frac{(index_2 - K_\Pi)}{2} \right\rfloor$$

means to round down $$\frac{(index_2 - K_\Pi)}{2}.$$

$$\left\lfloor \frac{\left\lfloor \frac{(index_2 - K_\Pi)}{2} \right\rfloor}{R^{TC}_{subblock}} \right\rfloor [4:0]$$

indicates that the binary data bit width obtained after calculation is 5 bits (bit), and $$\text{reverse}\left(\left\lfloor \frac{\left\lfloor \frac{(index_2 - K_\Pi)}{2} \right\rfloor}{R^{TC}_{subblock}} \right\rfloor [4:0]\right)$$

means to sort $$\left(\left\lfloor \frac{\left\lfloor \frac{(index_2 - K_\Pi)}{2} \right\rfloor}{R^{TC}_{subblock}} \right\rfloor [4:0]\right)$$

in a reverse sequence.

The expression for the specified address of the data of the third subblock is shown in formula (3):

$$addr_3(index_3) = \left(\left\lfloor \frac{(index_3 - K_\Pi)}{2} \right\rfloor \bmod R^{TC}_{subblock}\right) \times 2^5 + \quad (3)$$

-continued $$\text{reverse}\left(\left[\left\lfloor\frac{\left\lfloor\frac{(index_3 - K_\Pi)}{2}\right\rfloor}{R_{subblock}^{TC}}\right\rfloor\right][4:0]\right) + 1$$

In formula (3), all data is expressed in a binary form, $addr_3(index_3)$ indicates the acquired specified address of the data of the third subblock, and $index_3$ is an integer ranging from 0 to $(R_{subblock}^{TC} \times V_{subblock}^{TC} - 1)$. $K_\Pi$ a product of rows and columns of the matrix, that is, $K_\Pi$ equals $R_{subblock}^{TC} \times V_{subblock}^{TC}$.

$$\left\lfloor\frac{(index_3 - K_\Pi)}{2}\right\rfloor$$

means to round down $$\frac{(index_3 - K_\Pi)}{2}.$$

$$\left\lfloor\frac{\left\lfloor\frac{(index_3 - K_\Pi)}{2}\right\rfloor}{R_{subblock}^{TC}}\right\rfloor[4:0]$$

indicates that the binary data bit width obtained after calculation is 5 bits, and $$\text{reverse}\left(\left[\left\lfloor\frac{\left\lfloor\frac{(index_3 - K_\Pi)}{2}\right\rfloor}{R_{subblock}^{TC}}\right\rfloor\right][4:0]\right)$$

means to sort $$\left(\left[\left\lfloor\frac{\left\lfloor\frac{(index_3 - K_\Pi)}{2}\right\rfloor}{R_{subblock}^{TC}}\right\rfloor\right][4:0]\right)$$

in a reverse sequence.

In step 104, for data output by the second buffer from the specified address, data selection may be performed, which may be specifically performed by using a selection method such as ping-pong selection, subblock selection, or column selection, to select data in a specified subblock.

Step 105 may specifically be deleting dummy data in the selected data according to the acquired specified address. Specifically, the following may be included: For selected data, every two data items are grouped to one group; according to a sequence from high bits to low bits, judge whether data in each group is dummy data in turn according to the acquired specified address; change dummy data in each group to 0, add it to the lowest bits of valid output data, and add data that is not dummy data to the highest bits of valid output data.

For example, in step 104, 16 bits of data are selected from the specified subblock, and dummy data may be deleted by using every two bits of data as one group.

Specifically, a judgment is made about whether the highest two bits include dummy data, that is, a judgment is made about whether bit 15 and bit 14 are dummy data. Its output is called first-combination 2-bit data. Specifically, a judgment may be made about whether each data item is dummy data according to the acquired specified address of the data of each subblock. When the specified address is acquired, information about whether a data item is dummy data may be known. In step 105, a judgment may be made about whether a data item is dummy data according to these specified addresses. A judgment result may include four cases:

If bit 15 is dummy data, but bit 14 is not dummy data, a combination composed of one bit of 0 and data of bit 14 is output in sequence.

If bit 15 is not dummy data, but bit 14 is dummy data, a combination composed of one bit of 0 and data of bit 15 is output in sequence.

If bit 14 and bit 15 are both dummy data, a combination composed of two bits of 0 is output.

If neither bit 14 nor bit 15 is dummy data, a combination composed of data of bit 15 and bit 14 is output in sequence.

Then, a judgment is made about whether the second highest two bits include dummy data, that is, a judgment is made about whether bit 13 and bit 12 are dummy data. Its output is called second-combination 4-bit data, which includes four cases:

If bit 13 is dummy data, but bit 12 is not dummy data, a combination composed of one bit of 0, 2-bit data in the first combination, and data of bit 2 is output in sequence.

If bit 13 is not dummy data, but bit 12 is dummy data, a combination composed of one bit of 0, 2-bit data in the first combination, and data of bit 13 is output in sequence.

If bit 12 and bit 13 are both dummy data, a combination composed of data of two bits of 0 and 2-bit data in the first combination is output.

If neither bit 12 nor bit 13 is dummy data, a combination composed of 2-bit data in the first combination, data of bit 13 and data of bit 12 is output in sequence.

The rest is deduced through analogy. Two bits are judged every time from high bits to low bits. The two bits that take part in judgment are also judged according to a sequence from high bits to low bits. If the bit data is dummy data, change the bit data to 0 and add it to the lowest bits of the output data combination; otherwise, add the data to the highest bits of the output data combination. The length of the output combination data increases by 2 after judgment every time until 16 bits of output data are obtained after 16 bits of data are judged.

The rate matching method according to this embodiment provides a detailed rate matching implementation method.

After dummy data is inserted into bit data of three subblocks to respectively form even-numbered rows and odd-numbered rows of a matrix to be buffered for each subblock. Bit data of the even-numbered rows and bit data of the odd-numbered rows are respectively buffered to the even-numbered row buffer and odd-numbered row buffer of each subblock. Then data of each subblock is input to the second buffer, and a matrix is formed respectively by using the bit data of the even-numbered rows and the bit data of the odd-numbered rows of each subblock, implementing storage of bit data of each subblock. In such a data storage way, data in odd-numbered rows and even-numbered rows is stored simultaneously, and the parallel efficiency for data input is high.

The bit data of the even-numbered rows in the even-numbered row buffer and bit data of the odd-numbered rows in the odd-numbered row buffer of each subblock are input in a ping-pong buffering method to two sub buffers in the second buffer. The data input efficiency is high, and the delay is low.

Then the specified address of the data of each subblock is acquired. The sequence of these specified addresses is different from the input sequence of the bit data of each subblock, thereby implementing interleaving of bit data.

In this embodiment, the specified address of data of each subblock may be respectively acquired according to formulas (1), (2), and (3). Different input parameters are put into each formula to acquire specified addresses for multiple data items at one time, and these addresses are sent to the second buffer. After data of a specified subblock is selected, dummy data is deleted according to these specified addresses, where multiple dummy data items may be deleted at one time. Then valid data after dummy data is deleted is joined, implementing data bit collection and bit pruning of each subblock. As multiple specified addresses may be acquired at one time, when the second buffer outputs data and dummy data is deleted in subsequent steps, multiple data items may be processed at one time. The data processing efficiency is high.

Figure 5:
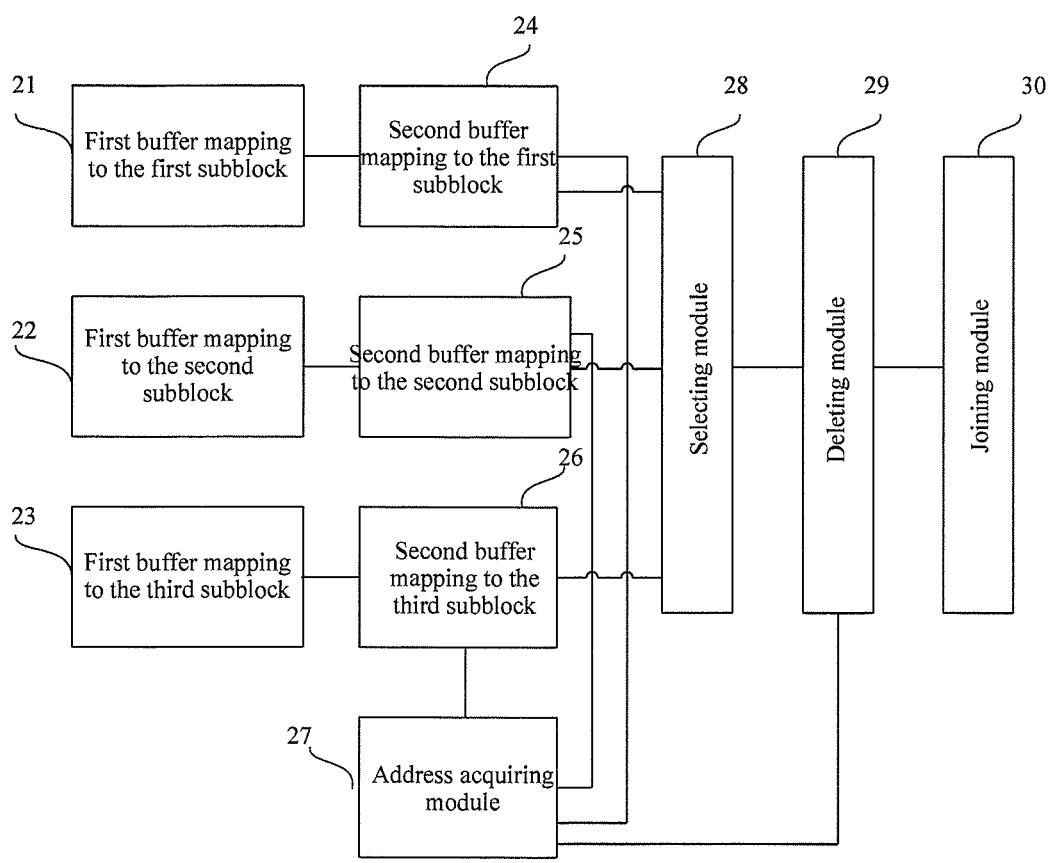
FIG. 5 is a schematic structural diagram of a rate matching apparatus according to the first embodiment of the present invention.

FIG. 5 is a schematic structural diagram of a rate matching apparatus according to an embodiment of the present invention. This apparatus includes a first buffer 21 mapping to a first subblock, a first buffer 22 mapping to a second subblock, a first buffer 23 mapping to a third subblock, a second buffer 24 mapping to a first subblock, a second buffer 25 mapping to a second subblock, a second buffer 26 mapping to a third subblock, an address acquiring module 27, a selecting module 28, a deleting module 29, and a joining module 30. The first buffer 21 mapping to the first subblock, the first buffer 22 mapping to the second subblock, and the first buffer 23 mapping to the third subblock each include an odd-numbered row buffer and an even-numbered row buffer, and are respectively configured to receive bit data of the input first subblock, second subblock, and third subblock, insert dummy data into bit data of the first subblock, the second subblock, and the third subblock to respectively form even-numbered rows and odd-numbered rows of a matrix to be buffered for the first subblock, the second subblock, and the third subblock, and respectively store bit data of the even-numbered rows and odd-numbered rows to the even-numbered row buffer and odd-numbered row buffer of the first subblock, the second subblock, and the third subblock.

The second buffer 24 mapping to the first subblock, the second buffer 25 mapping to the second subblock, and the second buffer 26 mapping to the third subblock are respectively configured to buffer bit data of the even-numbered rows in the even-numbered row buffer and bit data of the odd-numbered rows in the odd-numbered row buffer of the first subblock, the second subblock, and the third subblock, and respectively form a matrix of $R_{subblock}^{TC}$ rows and $V_{subblock}^{TC}$ columns by using the bit data of the even-numbered rows and the bit data of the odd-numbered rows.

The address acquiring module 27 is connected to the second buffer 24 mapping to the first subblock, the second buffer 25 mapping to the second subblock, and the second buffer 26 mapping to the third subblock, and is configured to acquire the specified address of the data of each subblock, and send the specified address of the data of each subblock to the second buffer 24 mapping to the first subblock, the second buffer 25 mapping to the second subblock, and the second buffer 26 mapping to the third subblock, so that each second buffer sends the data at the specified address. The address acquiring module 27 may further send the specified address to the deleting module 29.

The selecting module 28 is connected to the second buffer 24 mapping to the first subblock, the second buffer 25 mapping to the second subblock, and the second buffer 26 mapping to the third subblock, and is configured to receive data sent by the three second buffers and select data of a specified subblock from the received data.

The deleting module 29 is connected to the selecting module 28 and address acquiring module 27, and is configured to delete dummy data in the data selected by the selecting module 28 according to the specified addresses acquired by the address acquiring module 27 to obtain valid output data.

The joining module 30 is connected to the deleting module 29, and is configured to send the valid output data output by the deleting module 29 after joining, where a length of sent valid output data is equal to a preset output length.

In FIG. 5, the second buffer 24 mapping to the first subblock, the second buffer 25 mapping to the second subblock, and the second buffer 26 mapping to the third subblock may each include two sub buffers, which are respectively configured to receive input bit data of the even-numbered rows in the even-numbered row buffer and bit data of the odd-numbered rows in the odd-numbered row buffer of the first subblock, the second subblock, and the third subblock in a ping-pong buffering method, and respectively form a matrix by using the bit data of the even-numbered rows and the bit data of the odd-numbered rows.

The address acquiring module 27 may acquire the specified address of data of the first subblock according to formula (1), acquire the specified address of data of the second subblock according to formula (2), and acquire the specified address of data of the third subblock according to formula (3).

The deleting module 29 may be specifically configured to: for selected data, group every two data items to one group; according to a sequence from high bits to low bits, judge whether data in each group is dummy data in turn according to the specified address acquired by the address acquiring module 27; change dummy data in each group to 0, add it to the lowest bits of valid output data, and add data that is not dummy data to the highest bits of valid output data.

For the specific deletion procedure of the deleting module 29, reference may be made to the description in the method embodiment.

The rate matching apparatus according to this embodiment provides a detailed rate matching implementation apparatus.

After the first buffer mapping to each subblock inserts dummy data into bit data of each subblock, even-numbered rows and odd-numbered rows of a matrix to be buffered for each subblock are respectively formed. Bit data of the even-numbered rows and bit data of the odd-numbered rows are respectively buffered to the even-numbered row buffer and odd-numbered row buffer of each subblock. Then data of each subblock is input to the second buffer, and a matrix is formed respectively by using the bit data of the even-numbered rows and the bit data of the odd-numbered rows of each subblock, implementing storage of bit data of each subblock. In such a data storage method, data in odd-numbered rows and even-numbered rows is stored simultaneously, and the parallel efficiency for data input is high.

The second buffer mapping to each subblock buffers bit data of the even-numbered rows in the even-numbered row buffer and bit data of the odd-numbered rows in the odd-numbered row buffer of each subblock in a ping-pong buffering method. The data input efficiency is high, and the delay is low.

Then the address acquiring module acquires the specified address of the data of each subblock. The sequence of these addresses is different from the input sequence of the bit data of each subblock, thereby implementing interleaving of bit data.

In this embodiment, the address acquiring module may specifically acquire the specified address of data of each subblock respectively according to formulas (1), (2), and (3). Different input parameters are put into each formula to acquire specified addresses for multiple data items at one time, and these addresses are sent to each second buffer. After the selecting module selects data of specified subblocks, the deleting module deletes dummy data according to these specified addresses, where multiple dummy data items may be deleted at one time. Then the joining module joins valid data after dummy data is deleted, implementing data bit collection and bit pruning of each subblock. As multiple specified addresses may be acquired at one time, when the second buffer outputs data and the deleting module deletes dummy data in subsequent steps, multiple data items may be processed at one time. The data processing efficiency is high.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as a ROM, a RAM, a magnetic disk, or an optical disk, and the like.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent replacements to some technical features thereof, without departing from the spirit and scope of the technical solutions of the embodiments of the present invention.

What is claimed is:

1. A rate matching method, comprising:
receiving bit data of a first, a second, and a third input subblock, inserting dummy data into bit data in each subblock to respectively form even-numbered rows and odd-numbered rows of a matrix to be buffered for each subblock, and respectively storing bit data of the even-numbered rows and odd-numbered rows to an even-numbered row buffer and an odd-numbered row buffer of each subblock;
inputting bit data of the even-numbered rows in the even-numbered row buffer and bit data of the odd-numbered rows in the odd-numbered row buffer of each subblock to a second buffer mapping to each subblock, and respectively forming a matrix of $R_{subblock}^{TC}$ rows and $V_{subblock}^{TC}$ columns by using the bit data of the even-numbered rows and the bit data of the odd-numbered rows of each subblock;
acquiring a specified address of data of each subblock, and sending the specified address to the second buffer mapping to each subblock, so that the second buffer mapping to each subblock sends data at the specified address;
receiving data sent by the second buffer and selecting data of specified subblocks from the received data;
deleting dummy data from the selected data according to the specified address to obtain valid output data; and
sending the valid output data after joining, wherein a length of sent valid output data is equal to a preset output length;
wherein $T_{subblock}^{TC}$ defines the number of the rows in the matrix, and $V_{subblock}^{TC}$ defines the number of the columns in the matrix.

2. The method according to claim 1, wherein the inputting bit data of the even-numbered rows in the even-numbered row buffer and bit data of the odd-numbered rows in the odd-numbered row buffer of each subblock to a second buffer comprises:
respectively inputting bit data of the even-numbered rows in the even-numbered row buffer and bit data of the odd-numbered rows in the odd-numbered row buffer of each subblock in a ping-pong buffering method to two sub buffers in the second buffer.

3. The method according to claim 1, wherein the acquiring a specified address of data of each subblock comprises:
acquiring a specified address of data in the first subblock according to the following formula:

$$addr_1(index_1) = (index_1 \mod R_{subblock}^{TC}) \times 2^5 + \text{reverse}\left(\left\lfloor \frac{index_1}{R_{subblock}^{TC}} \right\rfloor [4:0]\right)$$

wherein, $addr_1(index_1)$ indicates the acquired specified address of the data of the first subblock, $index_1$ is an integer ranging from 0 to $(R_{subblock}^{TC} \times V_{subblock}^{TC} - 1)$, mode indicates modular operation, $$\left\lfloor \frac{index_1}{R_{subblock}^{TC}} \right\rfloor$$

means to round down $$\frac{index_1}{R_{subblock}^{TC}}, \left\lfloor \frac{index_1}{R_{subblock}^{TC}} \right\rfloor [4:0]$$

indicates that the binary data bit width obtained after calculation is 5 bits, and $$\text{reverse}\left(\left\lfloor \frac{index_1}{R_{subblock}^{TC}} \right\rfloor [4:0]\right)$$

means to sort $$\left\lfloor \frac{index_1}{R_{subblock}^{TC}} \right\rfloor [4:0]$$

in a reverse sequence.

4. The method according to claim 1, wherein the acquiring a specified address of data of each subblock comprises:
acquiring a specified address of data in the second subblock according to the following formula:

$$addr_2(index_2) = \left(\left\lfloor \frac{(index_2 - K_\Pi)}{2} \right\rfloor \mod R_{subblock}^{TC}\right) \times 2^5 + \text{reverse}\left(\left\lfloor \frac{\left\lfloor \frac{(index_2 - K_\Pi)}{2} \right\rfloor}{R_{subblock}^{TC}} \right\rfloor [4:0]\right)$$

wherein, $addr_2(index_2)$ indicates the acquired specified address of the data of the second subblock, $index_2$ is an integer ranging from 0 to $(R_{subblock}^{TC} \times V_{subblock}^{TC} - 1)$, which is a position sequence number of bit data of the second subblock output after an interleaving procedure in rate matching, mod indicates modular operation, $K_\Pi$ equals of $$R_{subblock}^{TC} \times V_{subblock}^{TC}, \left\lfloor \frac{(index_2 - K_\Pi)}{2} \right\rfloor$$

means to round down $$\frac{(index_2 - K_\Pi)}{2}, \left\lfloor \frac{\left\lfloor \frac{(index_2 - K_\Pi)}{2} \right\rfloor}{R^{TC}_{subblock}} \right\rfloor [4:0]$$

indicates that the binary data bit width obtained after calculation is 5 bits, and $$\text{reverse}\left(\left\lfloor \frac{\left\lfloor \frac{(index_2 - K_\Pi)}{2} \right\rfloor}{R^{TC}_{subblock}} \right\rfloor [4:0]\right)$$

means to sort $$\left(\left\lfloor \frac{\left\lfloor \frac{(index_2 - K_\Pi)}{2} \right\rfloor}{R^{TC}_{subblock}} \right\rfloor [4:0]\right)$$

in a reverse sequence.

5. The method according to claim 1, wherein the acquiring a specified address of data of each subblock comprises:
acquiring a specified address of data in the third subblock according to the following formula:

$$addr_3(index_3) = \left(\left\lfloor \frac{(index_3 - K_\Pi)}{2} \right\rfloor \bmod R^{TC}_{subblock}\right) \times 2^5 + \text{reverse}\left(\left\lfloor \frac{\left\lfloor \frac{(index_3 - K_\Pi)}{2} \right\rfloor}{R^{TC}_{subblock}} \right\rfloor [4:0]\right) + 1$$

wherein, $addr_3(index_3)$ indicates the acquired specified address of the data of the third subblock, $index_3$ an integer ranging from 0 to $(R^{TC}_{subblock} \times V^{TC}_{subblock} - 1)$, mod indicates modular operation, $K_\Pi$ equals of $$R^{TC}_{subblock} \times V^{TC}_{subblock}, \left\lfloor \frac{(index_3 - K_\Pi)}{2} \right\rfloor$$

means to round down $$\frac{(index_3 - K_\Pi)}{2}, \left\lfloor \frac{\left\lfloor \frac{(index_3 - K_\Pi)}{2} \right\rfloor}{R^{TC}_{subblock}} \right\rfloor [4:0]$$

indicates that the binary data bit width obtained after calculation is 5 bits, and $$\text{reverse}\left(\left\lfloor \frac{\left\lfloor \frac{(index_3 - K_\Pi)}{2} \right\rfloor}{R^{TC}_{subblock}} \right\rfloor [4:0]\right)$$

means to sort $$\left(\left\lfloor \frac{\left\lfloor \frac{(index_3 - K_\Pi)}{2} \right\rfloor}{R^{TC}_{subblock}} \right\rfloor [4:0]\right)$$

in a reverse sequence.

6. The method according to claim 1, wherein the deleting dummy data from the selected data according to the specified address to obtain valid output data comprises:
grouping every two data items to one group for selected data;
judging, according to a sequence from high bits to low bits, whether data in each group is dummy data in turn according to the acquired specified address; and
changing dummy data in each group to 0, adding it to lowest bits of valid output data, and adding data that is not dummy data to highest bits of valid output data.

7. A rate matching apparatus, comprising:
a first buffer respectively mapping to bit data of a first subblock, a second subblock, and a third subblock, comprising an odd-numbered row buffer and an even-numbered row buffer, respectively configured to receive bit data of a first, a second, and a third input subblock, insert dummy data into bit data in the first subblock, the second subblock, and the third subblock to respectively form even-numbered rows and odd-numbered rows of a matrix to be buffered for the first subblock, the second subblock, and the third subblock, and respectively store bit data of the even-numbered rows and odd-numbered rows to the even-numbered row buffer and odd-numbered row buffer of the first subblock, the second subblock, and the third subblock;
a second buffer respectively mapping to data of the first subblock, the second subblock, and the third subblock, respectively configured to buffer bit data of the even-numbered rows in the even-numbered row buffer and bit data of the odd-numbered rows in the odd-numbered row buffer of the first subblock, the second subblock, and the third subblock, and respectively form a matrix of $R_{subblock}^{TC}$ rows and $V_{subblock}^{TC}$ columns by using the bit data of the even-numbered rows and the bit data of the odd-numbered rows;
an address acquiring module, configured to acquire a specified address of data of each subblock, and send the specified address of the data of each subblock to the second buffer respectively mapping to the first subblock, the second subblock, and the third subblock, so that the second buffer sends data at the specified address;
a selecting module, configured to receive data sent by the second buffer and select data of specified subblocks from the received data;
a deleting module, configured to delete dummy data from the selected data according to the specified address acquired by the address acquiring module to obtain valid output data; and
a joining module, configured to send the valid output data after joining, wherein a length of sent valid output data is equal to a preset output length;
wherein $R_{subblock}^{TC}$ defines the number of the rows in the matrix, and $V_{subblock}^{TC}$ defines the number of the columns in the matrix.

8. The apparatus according to claim 7, wherein the second memories mapping to the first subblock, the second subblock, and the third subblock each comprise two sub buffers, wherein the two sub buffers are respectively configured to receive input bit data of the even-numbered rows in the even-numbered row buffer and bit data of the odd-numbered rows in the odd-numbered row buffer of the first subblock, the second subblock, and the third subblock in a ping-pong buffering method, and respectively form a matrix by using the bit data of the even-numbered rows and the bit data of the odd-numbered rows.

9. The apparatus according to claim 7, wherein the address acquiring module is specifically configured to acquire a specified address of data in the first subblock according to the following formula:

$$addr_1(index_1) = (index_1 \bmod R_{subblock}^{TC}) \times 2^5 + \text{reverse}\left(\left\lfloor \frac{index_1}{R_{subblock}^{TC}} \right\rfloor [4:0]\right)$$

wherein, $addr_1(index_1)$ indicates the acquired specified address of the data of the first subblock, $index_1$ is an integer ranging from 0 to $(R_{subblock}^{TC} \times V_{subblock}^{TC} - 1)$, mod indicates modular operation, $$\left\lfloor \frac{index_1}{R_{subblock}^{TC}} \right\rfloor$$

means to round down $$\frac{index_1}{R_{subblock}^{TC}}, \left\lfloor \frac{index_1}{R_{subblock}^{TC}} \right\rfloor [4:0]$$

indicates that the binary data bit width obtained after calculation is 5 bits, and $$\text{reverse}\left(\left\lfloor \frac{index_1}{R_{subblock}^{TC}} \right\rfloor [4:0]\right)$$

means to sort $$\left\lfloor \frac{index_1}{R_{subblock}^{TC}} \right\rfloor [4:0]$$

in a reverse sequence.

10. The apparatus according to claim 7, wherein the address acquiring module is specifically configured to acquire a specified address of data in the second subblock according to the following formula:

$$addr_2(index_2) =$$

$$\left(\left\lfloor \frac{(index_2 - K_\Pi)}{2} \right\rfloor \bmod R_{subblock}^{TC}\right) \times 2^5 + \text{reverse}\left(\left\lfloor \frac{\left\lfloor \frac{(index_2 - K_\Pi)}{2} \right\rfloor}{R_{subblock}^{TC}} \right\rfloor [4:0]\right)$$

wherein, $addr_2(index_2)$ indicates the acquired specified address of the data of the second subblock, $index_2$ is an integer ranging from 0 to $(R_{subblock}^{TC} \times V_{subblock}^{TC} - 1)$, mod indicates modular operation, $K_\Pi$ equals of $$R_{subblock}^{TC} \times V_{subblock}^{TC}, \left\lfloor \frac{(index_2 - K_\Pi)}{2} \right\rfloor$$

means round down $$\frac{(index_2 - K_\Pi)}{2}, \left\lfloor \frac{\left\lfloor \frac{(index_2 - K_\Pi)}{2} \right\rfloor}{R_{subblock}^{TC}} \right\rfloor [4:0]$$

indicates that the binary data bit width obtained after calculation is 5 bits, and $$\text{reverse}\left(\left\lfloor \frac{\left\lfloor \frac{(index_2 - K_\Pi)}{2} \right\rfloor}{R_{subblock}^{TC}} \right\rfloor [4:0]\right)$$

means to sort $$\left(\left\lfloor \frac{\left\lfloor \frac{(index_2 - K_\Pi)}{2} \right\rfloor}{R_{subblock}^{TC}} \right\rfloor [4:0]\right)$$

in a reverse sequence.

11. The apparatus according to claim 7, wherein the address acquiring module is specifically configured to acquire a specified address of data in the third subblock according to the following formula:

$$addr_3(index_3) = \left(\left\lfloor \frac{(index_3 - K_\Pi)}{2} \right\rfloor \bmod R_{subblock}^{TC}\right) \times 2^5 + \text{reverse}\left(\left\lfloor \frac{\left\lfloor \frac{(index_3 - K_\Pi)}{2} \right\rfloor}{R_{subblock}^{TC}} \right\rfloor [4:0]\right) + 1$$

wherein, $addr_3(index_3)$ indicates the acquired specified address of the data of the third subblock, $index_3$ is an integer ranging from 0 to $(R_{subblock}^{TC} \times V_{subblock}^{TC} - 1)$, mod indicates modular operation, $K_\Pi$ equals of $$R_{subblock}^{TC} \times V_{subblock}^{TC}, \left\lfloor \frac{(index_3 - K_\Pi)}{2} \right\rfloor$$

means to round down $$\frac{(index_3 - K_\Pi)}{2}, \left\lfloor \frac{\left\lfloor \frac{(index_3 - K_\Pi)}{2} \right\rfloor}{R_{subblock}^{TC}} \right\rfloor [4:0]$$

indicates that the binary data bit width obtained after calculation is 5 bits, and $$\text{reverse}\left(\left\lfloor \frac{\left\lfloor \frac{(index_3 - K_\Pi)}{2} \right\rfloor}{R_{subblock}^{TC}} \right\rfloor [4:0]\right)$$

means to sort $$\left(\left\lfloor \frac{\left\lfloor \frac{(index_3 - K_\Pi)}{2} \right\rfloor}{R_{subblock}^{TC}} \right\rfloor [4:0]\right)$$

in a reverse sequence.

12. The apparatus according to claim 7, wherein the deleting module is specifically configured to: group every two data items to one group for selected data; judge, according to a sequence from high bits to low bits, whether data in each group is dummy data in turn according to the specified address acquired by the address acquiring module; change dummy data in each group to 0, add it to the lowest bits of valid output data, and add data that is not dummy data to the highest bits of valid output data.

* * * * *